Patented Nov. 25, 1947

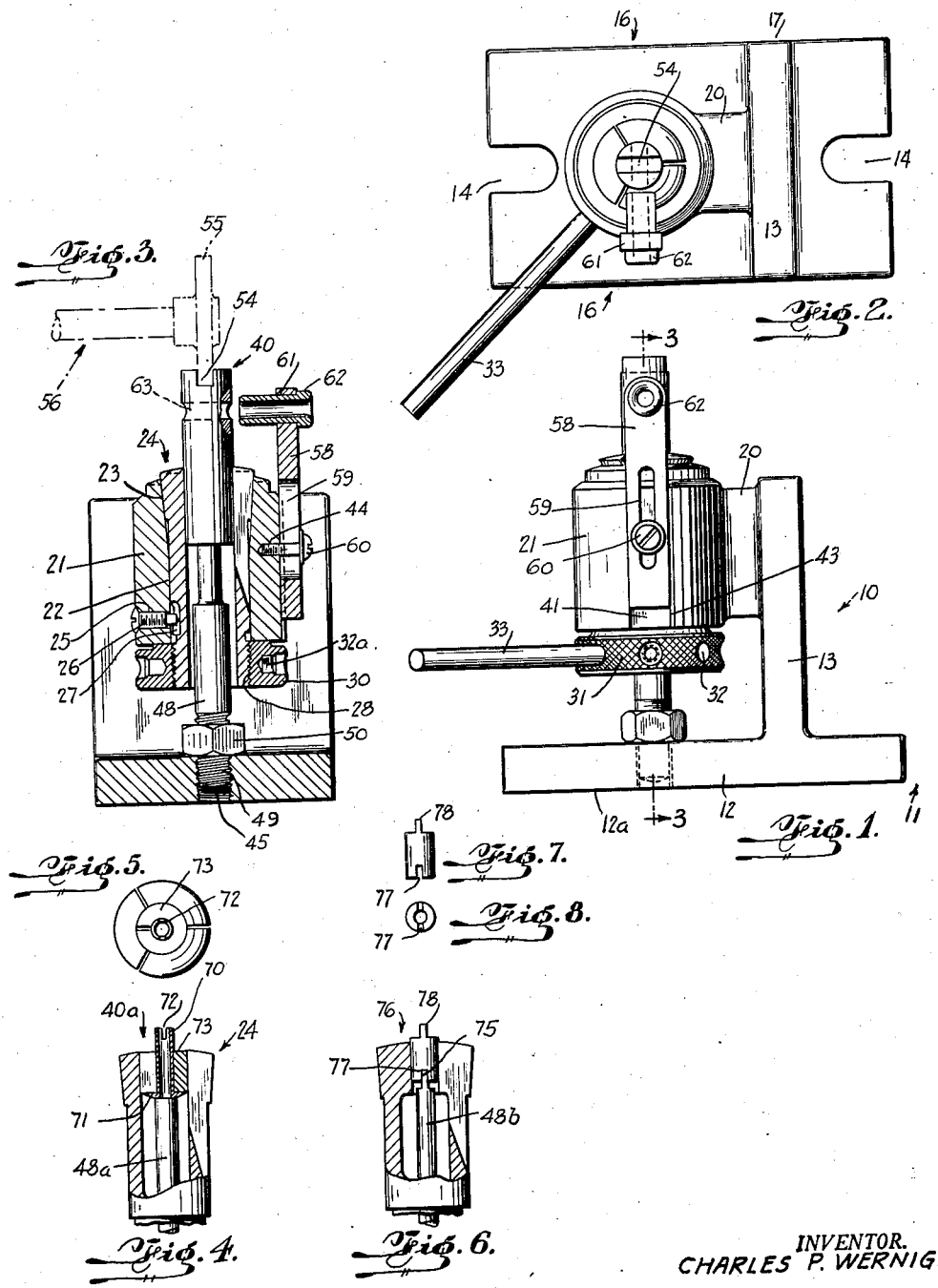

2,431,594

UNITED STATES PATENT OFFICE 2,431,594

COLLET CHUCK HOLDER

Charles P. Wernig, St. Albans, N. Y., assignor to Embosograf Corporation of America, New York, N. Y., a corporation of New York Application January 17, 1945, Serial No. 573,268

10 Claims. (Cl. 77—62)

This invention relates to machine tools. It is particularly directed to a collet holder which may be used as an adjustable fixture and drill jig for a milling machine.

An object of this invention is to provide a device of the character described comprising a base adapted to be clamped to the bed of a machine, such as a milling machine or drill press, lathe, etc., said base being formed with means to receive a collet chuck for gripping the work piece to be machined.

Another object of this invention is to provide in a device of the character described, an adjustable stop on the base projecting into the collet to fix the position of the work piece in the collet.

Another object of this invention is to provide a device of the character described in which the base is formed with bottom and sides ground square so that it can be clamped with the collet, either vertical or horizontal, and whereby said fixture may be used as a milling fixture for cutting slots, flats, square and hex heads, keyways, etc., and as a drilling fixture for drilling, tapping, boring, reaming, burring, counter-sinking, etc.

Still another object of this invention is to provide in a device of the character described an adjustable stop having means to locate the plane of one machining operation at one end of a work piece with respect to a previous machining operation performed on the other end of the work piece.

Yet another object of this invention is to provide in a fixture of the character described, adjustable means to locate drilled openings in a work piece clamped in the collet, whereby said work piece may be both milled and drilled or tapped, with one operation located relative to the other.

In accordance with the present invention the adjustable stop may be hollow to permit chips to fall through.

Yet a further object of this invention is to provide a strong, rugged, durable and compact machine tool of the character described which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention:

Fig. 1 is a side elevational view of a device embodying the invention.

Fig. 2 is a top plan view thereof.

Fig. 3 is a cross-sectional view taken on line 3—3 of Fig. 1.

Fig. 4 is a vertical view of a detail with parts broken away and in cross-section.

Fig. 5 is a top plan view of the structure shown in Fig. 4.

Fig. 6 is a view similar to Fig. 4 and illustrating another form of the invention.

Fig. 7 is a side elevational view of the work piece shown in Fig. 6.

Fig. 8 is a bottom plan view of the work piece shown in Fig. 7.

Referring now in detail to the drawing, 10 designates a machine tool or device embodying the invention. The same comprises a base 11. The base 11 has a flat bottom wall 12 from which there extends upwardly a vertical wall 13. Wall 13 is spaced from and parallel to the ends of bottom wall 12 and as wide as said bottom wall. Wall 12 is formed with central longitudinal notches 14 extending inwardly from the ends thereof to permit the device to be clamped to the bed of a machine such as of a milling machine, or a drill press, or a lathe, etc. The bottom surface 12a of wall 12 as well as the side edges 16 of the bottom wall as well as the side edges 17 of wall 13 are ground square so that the fixture may be used either with the surface 12a contacting the base of the machine, or with the side edges thereof contacting the bed of the machine.

Extending from the upper end of wall 13 is a web 20 from which there extends an integral vertical sleeve 21. The sleeve 21 is spaced above bottom wall 12 and is formed with a central through opening 22. At the upper end of opening 22 is a tapered or frusto-conical portion 23 having an angle conforming to the tapered head of a collet 24 inserted through the opening in the sleeve. Sleeve 21 is formed with a horizontal screw threaded opening 25 receiving a dog point set screw 26. The collet 24 may be of usual split construction except that it is formed with a longitudinal external slot 27 to receive the point of the set screw 26, to prevent turning of the collet within the sleeve 21. The collet 24 is formed, furthermore, at its lower end with external screw threads 28 for the purpose hereinafter appearing.

Screwed on to the threaded portion 28 of the collet is a collet locking collar or nut 30 contacting the lower end edge of the sleeve 21. The nut 30 may have a knurled exterior surface 31 and is formed with a plurality of radial blind openings 32 to receive a locking lever or handle 33 for turning the nut. At the bottom of each opening 32 is a reduced threaded hole 32a adapted to receive a correspondingly threaded part on the locking lever 33. It will now be understood that as the nut is rotated in one direction, the collet will be forced down into the sleeve to tighten the collet and grip the work piece 40 dropped into the collet.

The sleeve 21 may be furthermore formed on one side thereof with an external longitudinal vertical groove 41. The bottom surface 41 of the groove 41 is preferably parallel to the side edges of the base 11. Groove 41 also has parallel side edges 43 located in planes perpendicular to the side edges of the base 11. At the bottom of groove 41 is a screw-threaded opening 44 for the purpose hereinafter appearing.

The base 12 is formed with a screw-threaded opening 45 coaxial with the chuck 24. Screw-threadedly selectively receivable within the opening 45 are a plurality of bottom stop members, as for instance members 48, 48a, 48b. The bottom stop members have a screw-threaded lower end portion 49 receivable into opening 45. On threaded portion 49 is a lock nut 50 adapted to contact the upper surface of bottom wall 12 to lock the bottom stop 48 in adjusted position. The bottom stops 48 project up into the collet and serve as a stop for locating the work piece 40. It will now be understood that various stops 48 may be shaped and adjusted to accurately locate the position of the work piece 40.

The device 10 may be attached, for instance, to a milling machine to mill a slot 54 at the upper end of the work piece by means of a milling cutter 55 on a milling machine 56.

Means may be provided to locate drilled openings in the work piece. To this end there is slidably mounted in groove 41 a bar 58 which is provided with a longitudinal slot 59. Extending through the slot is a screw 60 screwed within threaded opening 44. By loosening the screw, the position of the bar may be adjusted longitudinally of the sleeve 21, after which the screw 60 may be tightened to fix the bar in place. At the upper end of bar 58 is a through opening 61 receiving a drill or tap bushing 62. It will now be understood that the device 10 may be placed on its side for drilling an opening 63 in the work piece by means of the drill bushing 62.

The device 10 is invaluable for use as an adjustable milling machine and drill jig. The collet is dropped in through the top of the sleeve and is kept from rotating by the set screw which engages a longitudinal slot in the side of the collet. The aperture in the collet is first adjusted roughly by turning the collet locking collar or nut 30 by hand to approximately the proper pressure. The collet locking lever 33 is then screwed into an appropriate threaded hole in the collet locking collar 30, after which the collet can be tightened or released by merely moving the lever to the right or left. As a milling fixture the device disclosed herein may be used for cutting slots, flats, square and hex heads, keyways, etc. As a drill fixture it may be used for drilling, tapping, boring, reaming, burring, counter-sinking, etc.

An improved feature of this invention is the adjustable and interchangeable stops which are screwed into the base directly below the center of the collet and extend upwardly into the hollow center of the collet. In many cases it is extremely important to be able to control accurately the depth of operation. This is accomplished very simply by means of the adjustable stop. The top of the stop forms a seat for the piece to be machined. The shape of the top portion of the stop depends on the piece to be machined. The top of the stop 48 may be flat or pointed or machined out to form an annular ring or machined to any other shape required. For example, in reaming it may be advisable to have clearance below the work piece for chips to drop through. In that case the stop would be turned from hollow tubing so that the chips could fall clear through.

In Figs. 4 and 5 there is shown a collet 24 and a stop 48a adjustably mounted on the base. Stop 48a may be made of tubing material. In said figures there is shown a work piece 40a having a tubular shank 70 formed with a flange head 71 at its lower end contacting the upper end of the stop. The work piece may be formed with a milled slot 72 at its upper end. A split ring 73 may be provided, to surround the shank 70 and to be gripped by the collet 24.

In Figs. 6, 7 and 8 there is illustrated an example of another form of interchangeable stop. In said figures there is shown an adjustable stop 48b formed with a transverse key 75 at its upper end. The work piece 76 has a slot 77 at its lower end to receive a key 75. With such construction a tongue 78 may be milled at the upper end of the work piece and in the same plane as the slot 77. Thus another important function of the adjustable stop is accomplished, to wit: the adjustable stop may serve to locate the depth of the work piece and also may serve as a keying device to locate the plane of one machining operation with respect to a previous operation performed at the other end of the work piece. If the work piece is to be milled with a slot at each end, both slots to be in the same plane, the top of the stop is made with a rib or key 75 to fit into one of the machined slots. By setting the slot with the rib parallel to the milling cutter, the second slot would be in the same plane as the first. If the second slot is to be at right angles to the first, the rib would be set at right angles to the milling cutter. Properly made stops can thus be similarly used to key slots and other milled surfaces to drilled holes or to key one drilled hole to another. Thus the angular position of the rib 75 may be adjusted and fixed relative to the angular position as well as the longitudinal position of the drill bushing.

Where the milling or drilling operation is located in relation to a shoulder on the piece which rests on the top of the collet, the adjustable stop is not needed as a bottoming device and can be removed entirely so that chips can be discharged from the bottom of the collet holder and the finished pieces can be automatically dropped through the collet into suitable receptacles when the pressure on the collet is released.

The adjustable drill jig slide on the side of the collet holder is used for locating holes to be drilled at right angles to the axis of the piece. The slide is moved out to the proper position and fitted with a bushing of the correct size for drilling, tapping, reaming, or other similar operation. Here again, it can be used in conjunction with the adjustable stop for accurately locating the piece in the collet or for keying the piece to the proper angle with reference to previous machining operations.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, what I claim as new and desire to secure by Letters Patent, is:

1. A device of the character described comprising a base, said base comprising a bottom wall, and a vertical wall extending upwardly from the bottom wall, a collet chuck on said base, said bottom wall being formed with a screw-threaded opening co-axial with said chuck, said chuck being spaced above said bottom wall, a collet stop screwed to the screw-threaded opening in the bottom wall and projecting into said chuck.

2. A device of the character described comprising a base, said base comprising a bottom wall, and a vertical wall extending upwardly from the bottom wall, a collet chuck on said base, said bottom wall being formed with a screw-threaded opening co-axial with said chuck, said chuck being spaced above said bottom wall, a collet stop screwed to the screw-threaded opening in the bottom wall and projecting into said chuck, a collet within said chuck, means on the chuck to prevent rotation of the collet in said chuck, said collet having a screw-threaded portion at its lower end projecting below said chuck, and a collet locking collar screwed to said screw-threaded portion of said collet and contacting the lower end of said chuck.

3. A device of the character described comprising a base, said base comprising a bottom wall, and a vertical wall extending upwardly from the bottom wall, a collet chuck on said base, said bottom wall being formed with a screw-threaded opening co-axial with said chuck, said chuck being spaced above said bottom wall, a collet stop screwed to the screw-threaded opening in the bottom wall and projecting into said chuck, a collet within said chuck, means on the chuck to prevent rotation of the collet in said chuck, said collet having a screw-threaded portion at its lower end projecting below said chuck, a collet locking collar screwed to said screw-threaded portion of said collet and contacting the lower end of said chuck, said chuck being formed with a longitudinal external groove, a bar slidably mounted in said groove, means to fix said bar to said chuck, and a drill bushing on said bar.

4. A device of the character described comprising a base, said base comprising a bottom wall, and a vertical wall extending upwardly from the bottom wall, a collet chuck on said base, said bottom wall being formed with a screw-threaded opening co-axial with said chuck, said chuck being spaced above said bottom wall, a collet stop screwed to the screw-threaded opening in the bottom wall and projecting into said chuck, a collet within said chuck, means on the chuck to prevent rotation of the collet in said chuck, said collet having a screw-threaded portion at its lower end projecting below said chuck, a collet locking collar screwed to said screw-threaded portion of said collet and contacting the lower end of said chuck, said chuck being formed with a longitudinal external groove, a bar slidably mounted in said groove, means to fix said bar to said chuck, and a drill bushing on said bar, said collet stop being formed with a transverse upwardly extending rib at its upper end.

5. A device of the character described comprising a substantially L-shaped support, both sides of said support being parallel and smooth, a collet chuck on one leg of said L with its axis parallel to said leg and perpendicular to the other leg of said L, a collet in said chuck and a stop screwed to said other leg and projecting into said collet.

6. A device of the character described comprising a substantially L-shaped support, both sides of said support being parallel and smooth, a collet chuck on one leg of said L with its axis parallel to said leg and perpendicular to the other leg of said L, a collet in said chuck and a stop screwed to said other leg and projecting into said collet, said stop being formed with a rib at its upper end.

7. A device of the character described comprising a substantially L-shaped support, both sides of said support being parallel and smooth, a collet chuck on one leg of said L with its axis parallel to said leg and perpendicular to the other leg of said L, a collet in said chuck and a stop screwed to said other leg and projecting into said collet, and means on said chuck to support a drill bushing for drilling a work piece in the collet.

8. A device of the character described comprising a substantially L-shaped support, both sides of said support being parallel and smooth, a collet chuck on one leg of said L with its axis parallel to said leg and perpendicular to the other leg of said L, a collet in said chuck and a stop screwed to said other leg and projecting into said collet, said stop being formed with a rib at its upper end, a member adjustable longitudinally of the chuck, and a drill bushing on said member for locating a drilled opening in a work piece in the collet.

9. A device of the character described comprising a substantially L-shaped support adapted to be used on the bed of a machine, both sides of said support being parallel and smooth, a collet chuck on one leg of said L with its axis parallel to said leg and perpendicular to the other leg of the L, said chuck being adapted to receive a collet, and an adjustable collet stop on said other leg adapted to project into the collet to locate the depth of a work piece inserted into the collet, and means to locate a drilling operation longitudinally on said work piece.

10. A device of the character described comprising a substantially L-shaped support adapted to be used on the bed of a machine, both sides of said support being parallel and smooth, a collet chuck on one leg of said L with its axis parallel to said leg and perpendicular to the other leg of the L, said chuck being adapted to receive a collet, and an adjustable collet stop on said other leg adapted to project into the collet to locate the depth of a work piece inserted into the collet, and means to locate a drilling operation longitudinally on said work piece, and means on the collet stop to locate the angular position of the work piece in the collet.

CHARLES P. WERNIG.

REFERENCES CITED

The following references are of record in the file of this patent:

UNITED STATES PATENTS

| Number | Name | Date |
| --- | --- | --- |
| 1,017,846 | Budlong | Feb. 20, 1912 |
| 917,152 | Richards | Apr. 6, 1909 |
| 2,353,757 | Priest, Jr. | July 18, 1944 |
| 1,097,726 | Miller et al. | May 26, 1914 |
| 1,260,130 | Bemis | Mar. 19, 1918 |
| 2,308,493 | De Rentus | Jan. 19, 1943 |
| 2,338,060 | Redmer | Dec. 28, 1943 |